United States Patent [19]

Yukawa et al.

[11] Patent Number: 4,651,706
[45] Date of Patent: Mar. 24, 1987

[54] IGNITION SYSTEM FOR INTERNAL COMBUSTION ENGINE

[75] Inventors: Hideki Yukawa, Susono; Hiroyuki Horibe, Numazu, both of Japan

[73] Assignee: Kokusan Denki Co., Ltd., Numazu, Japan

[21] Appl. No.: 770,318

[22] Filed: Aug. 28, 1985

[30] Foreign Application Priority Data

Aug. 29, 1984 [JP] Japan ............................ 59-130750[U]

[51] Int. Cl.$^4$ .......................................... F02P 5/155
[52] U.S. Cl. ................................ 123/651; 123/149 C; 123/427
[58] Field of Search ................... 123/149 C, 427, 602, 123/651, 418

[56] References Cited

U.S. PATENT DOCUMENTS

| | | | |
|---|---|---|---|
| 4,292,943 | 10/1981 | Kyogoku et al. | 123/427 |
| 4,407,246 | 10/1983 | Boyama | 123/418 X |
| 4,473,050 | 9/1984 | Kondo et al. | 123/602 X |
| 4,516,554 | 5/1985 | Miura et al. | 123/602 X |
| 4,552,110 | 11/1985 | Yoshida et al. | 123/418 X |

*Primary Examiner*—Tony M. Argenbright
*Attorney, Agent, or Firm*—Pearne, Gordon, McCoy & Granger

[57] ABSTRACT

An ignition system for an internal combustion engine is disclosed which is adapted to carry out the comparison between an integrating voltage of a first integrating circuit and that of a second integrating circuit by means of a comparator to obtain advance characteristics. An ignition operation allowable interval detection signal generating circuit of the ignition system comprises a charge control transistor turned on when a first pulse signal is generated, a signal accumulating capacitor charged to a given voltage through the transistor, and a discharge control transistor for momentarily discharging the capacitor when a second pulse signal is generated. Such construction of the detection signal generating circuit allows the structure of the ignition system to be significantly simplified. Also, the connection of a speed-up capacitor between a base of the first integrating circuit and an emitter thereof permits the first capacitor to be charged to a substantially constant initial voltage without being affected by an ambient temperature. Further, a reset circuit may be provided with a malfunction preventing capacitor to prevent the shortening of duration of spark.

7 Claims, 4 Drawing Figures

IGNITION SYSTEM FOR INTERNAL COMBUSTION ENGINE

BACKGROUND OF THE INVENTION

1. Field of the Invention

This invention relates to an ignition system for an internal combustion engine, and more particularly to such an ignition system which is adapted to control a primary current of an ignition coil by means of a semiconductor switch to induce high voltage for ignition.

2. Description of the Prior Art

As an ignition system of such type which has been conventionally proposed in the art, an electronic control ignition system is known which is constructed to obtain ignition position advance characteristics using an electronic circuit comprising integrating circuits, a comparator circuit and the like. Such a conventional ignition system typically includes first and second signal coils which are adapted to generate first and second signals at the maximum advanced position and minimum advanced position of an engine, respectively. A flip flop circuit is driven by means of the first and second signals from the signal coils, to thereby generate an ignition operation allowable interval detecting signal (hereinafter referred to as "allowable interval detecting signal") continuing over an ignition operation allowable interval (hereinafter referred to as "allowable interval") corresponding to the interval from the maximum advanced position to the minimum advanced position and an ignition operation prohibiting interval detecting signal (hereinafter referred to as "prohibiting interval detecting signal") continuing over an ignition operation prohibiting interval (hereinafter referred to as "prohibiting interval") corresponding to the interval from the minimum advanced position to the subsequent maximum advanced position. First and second integrating circuits are controlled by such detecting signals to respectively generate a first integrating voltage having a waveform in which a voltage value is initially kept constant during the prohibiting interval from the minimum advanced position to the next maximum advanced position, then linearly increased during the allowable interval from the maximum advanced position to the next minimum advanced position and finally returned to the initial value at the minimum advanced position, and a second integrating voltage having a waveform in which a voltage value is increased at a constant gradient during the prohibiting interval from the minimum advanced position to the next maximum advanced position, then kept constant during the allowable interval between the maximum advanced position to the next minimum advanced position and finally returned to zero at the minimum advanced position, respectively. The so-generated first and second integrating voltages are compared in a comparator in order to detect a time when the first integrating voltage is larger than the second one. Upon the detection, a primary current control switch is turn off to carry out the ignition operation.

The electronic control ignition system of such construction as described above has an advantage capable of precisely determining an advanced width, an advance initiating engine speed and an advance terminating engine speed. However, it must use, for the purpose of obtaining the allowable interval detecting signal and prohibiting interval detecting signal, a flip flop circuit in which a number of logic elements including NAND circuits and the like are combined together. This causes the ignition system to be significantly large-sized because the arrangement of such flip flop circuits in the system requires a large space. Also, the conventional ignition system has another disadvantage that the trigger level of the logic elements is low sufficiently to readily cause the malfunction of the logic elements due to noise, leading to the malfunction of the flip flop circuit due to noise occurring at the generation of ignition spark. The conventional ignition system exhibits a further disadvantage that when a transistor is used as a switch element for controlling the charging of a first integrating capacitor, the first integrating capacitor is varied in charging voltage depending upon $h_{FE}$ of the transistor, so that the advance initiating engine speed is varied due to an ambient temperature.

In an ignition system of the current interrupting type that the ignition operation is carried out by turning off a primary current control switch at the ignition timing of an engine, it is required to lengthen to a certain degree a time during which the primary current control switch is kept at a turned-off state in order to lengthen a period of time during which ignition spark is generated to exhibit satisfied ignition performance. However, in a conventional ignition system of such type, a first integrating capacitor is often driven or triggered due to noise generated by spark discharge immediately after the spark discharge occurs at an ignition plug. The occurrence of such a phenomenon causes a first integrating voltage to be equal to below a second integrating voltage immediately after the spark discharge occurs at the ignition plug, so that a period of time during which a comparator keeps the primary current control switch at a turned-off state is substantially shortened to deteriorate the ignition performance.

SUMMARY OF THE INVENTION

The present invention has been made in view of the foregoing disadvantage of the prior art.

Accordingly, it is an object of the present invention to provide an ignition system for an internal combustion engine which is capable of eliminating the use of a flip flop circuit constituted by a number of logic elements to significantly simplify the structure.

It is another object of the present invention to provide an ignition system for an internal combustion engine which is capable of suitably setting the trigger level of each of a charge control transistor switch and a discharge control transistor switch to effectively prevent the malfunction of an allowable interval detecting signal generating circuit due to noise generated at the ignition operation.

It is a further object of the present invention to provide an ignition system for an internal combustion engine which is capable of charging a first capacitor to an initial voltage of a substantially constant level by means of a speed-up capacitor connected between the base of a transistor of a first integrating circuit and the emitter thereof to eliminate the influence of an ambient temperature thereon to carry out the positive ignition operation.

It is a still further object of the present invention to provide an ignition system for an internal combustion engine which is capable of effectively preventing a first integrating capacitor from being discharged to a level below a second integrating voltage when a reset transistor is turned on due to noise generated at the ignition operation and a first integrating voltage from being equal to or below the second integrating voltage to shorten the duration of spark discharge.

In accordance with the present invention, there is provided an ignition system for an internal combustion engine comprising an ignition coil; a primary current control switch arranged on the primary winding side of the ignition coil; and a control circuit for carrying out control which causes the primary current control switch to be changed from a turned-on state to a turned-off state at the ignition timing of the engine in order to quickly vary a primary current of the ignition coil to generate a high voltage for ignition; wherein the control circuit comprises signal generating means which generates first and second signals at the maximum advanced position $\theta 1$ and minimum advanced position $\theta 2$ of the ignition timing of the engine in synchronism with the rotation of the engine, respectively; a first pulse shaping circuit for shaping the first signal into a pulse-like form to generate a first pulse signal Vp1 at the maximum advanced position $\theta 1$; a second pulse shaping circuit for shaping the second signal into a pulse-like form to generate a second pulse signal Vp2 at the minimum advanced position; an ignition operation allowable interval detecting signal generating circuit for generating an ignition operation allowable interval detecting signal which continues from the maximum advanced position $\theta 1$ to the minimum advanced position $\theta 2$ by using said first and second pulse signals as its input signals; the ignition operation allowable interval detecting signal generating circuit comprising a charge control transistor switch which is turned on when the first pulse signal is generated, a signal accumulating capacitor which is momentarily charged to a fixed level through the charge control transistor switch and a discharge control transistor switch which momentarily discharges the signal accumulating capacitor when the second pulse signal is generated; a first integrating circuit controlled by the allowable interval detecting signal to carry out the integrating operation for charging a first integrating capacitor from the maximum advanced position $\theta 1$ to the minimum advanced position $\theta 2$; a reset circuit which momentarily discharges the first integrating capacitor when the second pulse signal is generated; a second integrating circuit controlled by the second pulse signal to carry out the integrating operation for charging a second integrating capacitor at a fixed time constant from a position right after a minimum advanced position to the next minimum advanced position and momentarily discharging the second integrating capacitor at the next minimum advanced position; and a comparator circuit having an output terminal coupled to a control signal input terminal of the primary current control switch and using a first integrating voltage Vc1 generated across the first integrating capacitor and a second integrating voltage Vc2 generated across the second integrating capacitor as its input signals to keep the primary current control switch at a turned-on state when the first integrating voltage is equal to or below the second integrating voltage and turn off the primary current control switch when the first integrating voltage exceeds the second integrating voltage.

BRIEF DESCRIPTION OF THE DRAWINGS

These and other objects and many of the attendant advantages of the present invention will be readily appreciated as the same becomes better understood by reference to the following description when considered in connection with the accompanying drawings in which like reference characters designate like or corresponding parts throughout; wherein.

DETAILED DESCRIPTION OF THE PREFERRED EMBODIMENTS

Now, an ignition system for an internal combustion engine according to the present invention will be described hereinafter with reference to the accompanying drawings.

Figure 1:
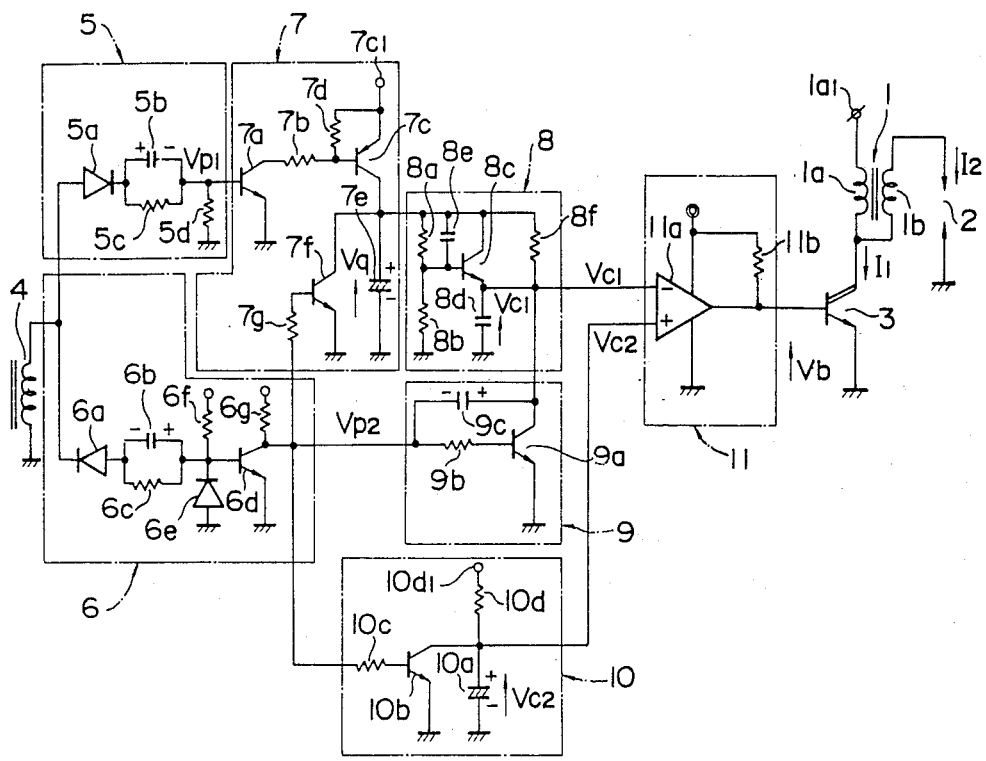
FIG. 1 is a circuit diagram showing one embodiment of an ignition system for an internal combustion engine according to the present invention.

FIG. 1 shows an embodiment of an ignition system for an internal combustion engine according to the present invention. In FIG. 1, reference numeral 1 designates an ignition coil having a primary winding 1a and a secondary winding 1b of which one ends are connected together, 2 indicates an ignition plug mounted on a cylinder of an engine (not shown) connected through a high tension cord to one terminal of the secondary winding 1b of the ignition coil 1. The one ends of the primary and secondary windings 1a and 1b of the ignition coil 1 are connected together to a collector of a transistor 3, and the other end 1a1 of the primary winding 1a is connected to a positive terminal of a battery (not shown). In the illustrated embodiment, a darlington transistor circuit comprising a plurality of transistors is used as the transistor 3.

The transistor 3 constitutes a primary current control switch and is controlled by a control circuit described below so that it may be turned on at a timing when the phase is advanced with respect to the ignition timing of the engine and turned off at the ignition timing. When the transistor 3 is turned off, a primary current which has flowed through the primary winding 1a of the ignition coil 1 and a collector-emitter circuit of the transistor 3 until the the transistor is turned off is cut off, so that a high voltage having polarity which is to cause the primary current to continue to flow through the primary winding 1a is induced across the primary winding 1a. At this time, magnetic flux in an iron core of the ignition coil 1 is highly varied, so that a high voltage may be induced across the secondary winding 1b. The so-induced high voltage is applied to the ignition plug 2 to cause spark discharge to be generated at the plug 2, thus, the engine is ignited.

A control circuit for controlling the transistor 3 acting as the primary current control switch comprises a signal coil or pulser coil 4, first and second pulse shaping circuits 5 and 6, a circuit 7 for generating an allowable interval detecting signal, a first integrating circuit 8, a reset circuit 9, a second integrating circuit 10, and a comparator circuit 11.

The signal coil or pulser coil 4 is arranged in a signal generator which is rotated in synchronism with the rotation of the engine and, as shown in FIG. 2A, adapted to generate a first signal Vs1 and a second signal Vs2 at the maximum and minimum advanced positions $\theta 1$ and $\theta 2$ of the engine, respectively.

The first pulse shaping circuit 5 comprises a differentiating circuit constituted by a diode 5a, a capacitor 5b and a resistor 5c each connected at one end thereof to a cathode of the diode 5a, and a resistor 5d connected between the other end of each of the capacitor 5b and resistor 5c and ground.

The second pulse shaping circuit 6 comprises a diode 6a, a capacitor 6b and a resistor 6c each of which is connected at one end thereof to an anode of the diode 6a, a waveform shaping transistor (NPN transistor) 6d of which a base is connected to the common connection between the other ends of the capacitor 6b and resistor 6c, a diode 6e connected between the base of the transistor 6d and ground, and resistors 6f and 6g.

The allowable interval detecting signal generating circuit 7 comprises an NPN transistor 7a connected to one terminal of the resistor 5d of the first pulse shaping circuit 5, a PNP transistor 7c of which a base is connected through a resistor 7b to a collector of the transistor 7a, a resistor 7d connected between an emitter of the transistor 7c and a base thereof, a signal accumulating capacitor 7e connected between a collector of the transistor 7c and ground, an NPN transistor 7f of which an emitter-collector circuit is connected to both ends of the capacitor 7e, and a resistor 7g of which one end is connected to a base of the transistor 7f. A terminal 7c1 connected to an emitter of the transistor 7c is connected to an output terminal of a voltage stabilizer (not shown) of which a power supply comprises a battery. In the illustrated embodiment, the transistors 7a and 7c and the resistors 7b and 7d constitute a charge control transistor switch together, and the transistor 7f and resistor 7g constitute a discharge control transistor switch.

As can be seen from the foregoing, in the illustrated embodiment, the allowable interval detecting signal generating circuit 7 is constituted by the signal accumulating capacitor 7e and the transistor for controlling the charge and discharge of the capacitor, so that the ignition system of the illustrated embodiment may be highly simplified in structure as compared with the conventional one using the flip flop circuit constituted by a number of logic elements. Also, the malfunction due to noise can be effectively prevented by suitably setting the trigger level of the transistor switch which serves to control the charge and discharge of the capacitor 7e.

The first integrating circuit 8 comprises a voltage divider consisting of resistors 8a and 8b connected in parallel to both ends of the capacitor 7e, a transistor 8c for the first integrating circuit of which a base is connected to a voltage dividing point of the voltage divider, a first integrating capacitor 8d connected between an emitter of the transistor 8c and ground, a speed-up capacitor 8e connected between a base of the transistor 8c and the emitter thereof, and a resistor 8f connected between a collector of the transistor 8c and the emitter thereof.

The reset circuit 9 comprises a reset transistor 9a, a resistor 9b and a malfunction preventing capacitor 9c.

The second integrating circuit 10 comprises a second integrating capacitor 10a, a discharge transistor 10b of which a collector is connected one end of the capacitor 10a, a resistor 10c connected between a base of the transistor 10b and the collector of the waveform shaping transistor 6d, and a resistor 10d of which one end is connected to the collector of the transistor 10b. The other end 10d1 of the resistor 10d is connected to the output terminal of the voltage stabilizer (not shown).

The comparator circuit 11 comprises a voltage comparator 11a comprising an integrated circuit and a resistor 11b. One input terminal of the comparator 11a is applied thereto a first integrating voltage Vc1 which is induced across the first integrating capacitor 8d, and the other input terminal of the comparator 11a is applied to thereto a second integrating voltage Vc2 which is induced across the second integrating capacitor 10a.

Now, the manner of operation of the ignition system of the illustrated embodiment constructed as described above will be described hereinafter with reference to FIG. 2.

Figure 2:
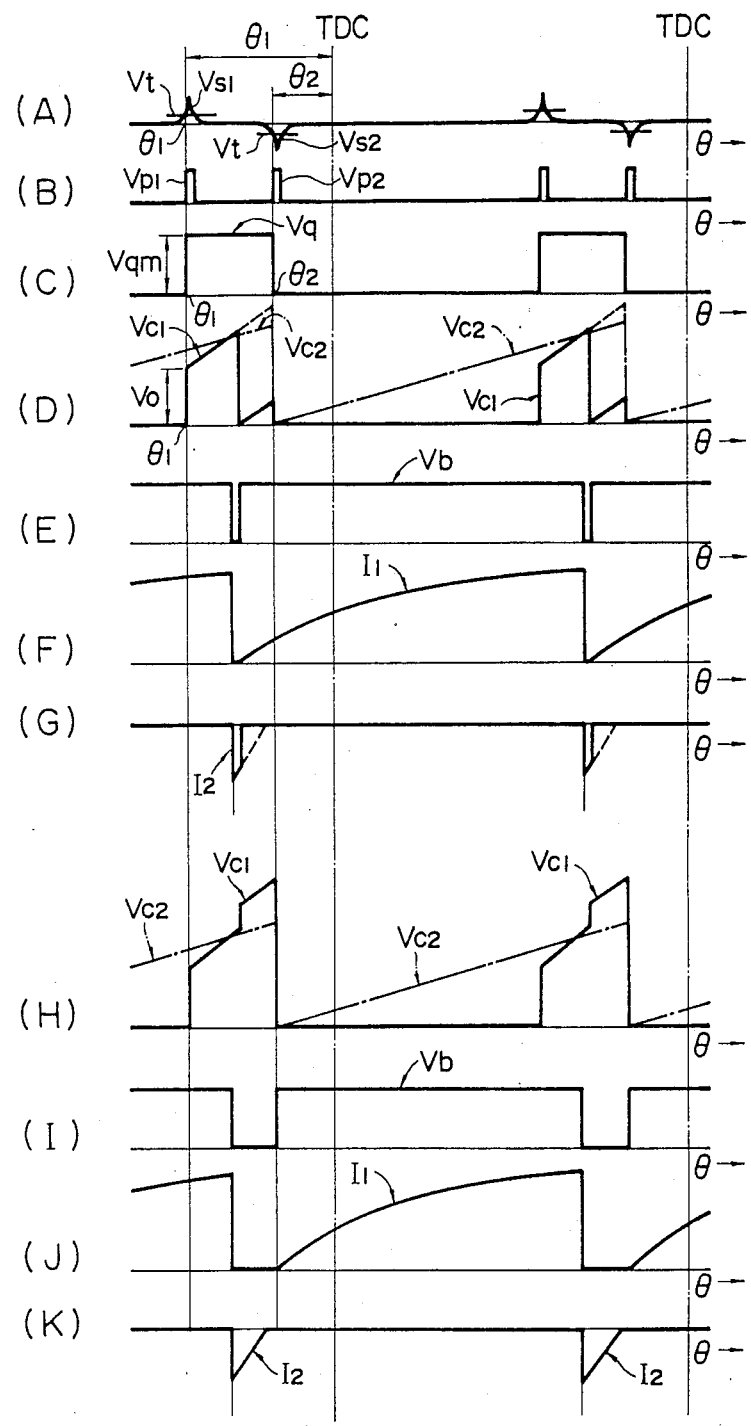
FIG. 2 is a waveform of signals generated at the respective portions of the ignition system shown in FIG. 1.

FIG. 2A shows the waveforms of the first and second signals Vs1 and Vs2 obtained at the signal coil 4, and FIG. 2B shows the waveforms of the first and second pulse signals Vp1 and Vp2. FIG. 2C shows the waveform of an allowable interval detecting signal Vq. FIGS. 2D to 2G show waveforms of the integrating voltages Vc1 and Vc2, a voltage Vb at the output terminal of the comparator circuit 11, the primary current I1 of the ignition coil, and secondary current I2 of the ignition coil, respectively, supposing that the malfunction preventing capacitor 9c is not arranged. FIGS. 2H to 2K show the waveforms of the integrating voltages Vc1 and Vc2, the voltage Vb at the output terminal of the comparator circuit 11, the primary current I1 of the ignition coil, and the secondary current I2 of the ignition coil, respectively, supposing that the malfunction preventing capacitor 9c is arranged. The axis of abscissas in FIG. 2 indicates the rotational angle $\theta$ of the engine, and $\theta 1$ and $\theta 2$ are measured on the basis of the dead center TDC of the engine.

The signal coil 4, as shown in FIG. 2A, generates the first signal Vs1 which is equal to or above a threshold level Vt at the maximum advanced position $\theta 1$ and the second signal Vs2 which is equal to or above the threshold level Vt at the minimum advanced position $\theta 2$. The first pulse shaping circuit 5 serves to differentiate the first signal Vs1 to generate the first pulse signal Vp1 at the maximum advanced position $\theta 1$ as shown in FIG. 2B.

In the second waveform shaping circuit 6, a current is supplied to the base of the transistor 6d through the resistor 6f from power supply (not shown) to turn on the transistor 6d. The generation of the second signal Vs2 allows a current to flow through the diode 6e, resistor 6c, capacitor 6b and diode 6a of the second pulse shaping circuit 6. When a voltage across the diode 6e reaches a predetermined level at the minimum advanced position $\theta 2$ or the second signal Vs2 is equal to or above the threshold level, the base-emitter of the transistor 6d is biased in the reverse direction, to thereby cause the transistor 6d to be turned off. Then when the second signal Vs2 is decreased to a level below the threshold level Vt, the transistor 6d is turned on again. Thus, the second pulse signal Vp2 is generated between the collector of the transistor 6d and the emitter thereof which has a pulse width corresponding to a period of time during which the second signal Vs2 is equal to or above the threshold level Vt.

When the first pulse signal Vp1 is generated at the maximum advanced position $\theta 1$, the transistor 7a is turned on to cause the transistor 7c to be subsequently turned on. The turning-on of the transistors leads to the momentary charging of the capacitor 7e to a fixed voltage Vqm, as shown in FIG. 2C. Subsequently, when the second pulse signal Vp2 is generated at the minimum advanced position or the transistor 6d falls into a turned-off state, a current is supplied through the resistor 7g to the base of the transistor 7f to turn on the transistor 7f, so that the capacitor 7e may be momentarily discharged through the transistor 7f. This permits the allowable interval detecting signal Vq (FIG. 2C) which continues from the maximum advanced position $\theta1$ to the minimum advanced position $\theta2$ to be generated across the capacitor 7e.

When the detecting signal Vq is generated as described above, the transistor 8c of the first integrating circuit 8 is turned on to cause the first integrating capacitor 8d to be momentarily charged to a level of the initial voltage corresponding to the difference between the voltage at the connection between the resistors 8a and 8b and the base-emitter voltage of the transistor 8c. Such charging of the capacitor 8d to the initial voltage Vo causes the transistor 8c to fall into a turned-off state, because a current is not supplied to the base of the transistor 8c. The, the capacitor 8d is further charged at a given time constant through the charging resistor 8f connected between the collector of the transistor 8c and the emitter thereof. Accordingly, the first integrating voltage Vc1 induced across the capacitor 8d is momentarily raised to the initial voltage Vo at the maximum advanced position $\theta1$ as seen from the waveforms shown in FIGS. 2D or 2H and then further increased.

In the second integrating circuit 10, the second integrating capacitor 10a is charged at a given time constant from just after the minimum advanced position $\theta2$ to the subsequent minimum advanced position $\theta2$. When the second pulse signal is generated at the minimum advanced position $\theta2$, the transistor 10b is turned on to cause the capacitor 10a to be discharged. Accordingly, the second integrating voltage is induced across the second integrating capacitor 10a, as shown in FIGS. 2D or 2H.

The above-described first and second integrating voltages Vc1 and Vc2 are supplied to the input terminals of the comparator circuit 11. As shown in FIGS. 2E or 2G, potential at the output terminal of the comparator circuit 11 is at a high level when the first integrating voltage Vc1 is equal to or below the second integrating voltage Vc2, whereas it is ground potential (zero voltage) while the first integrating voltage Vc1 exceeds the second integrating voltage Vc2. Accordingly, when the first integrating voltage Vc1 is below the second integrating voltage Vc2, the comparator circuit 11 permits a current to flow through the base of the transistor 3 acting as the primary current control switch to turn on the transistor 3, so that the primary current I1 may flow through the primary winding 1a of the ignition coil 1, as shown in FIGS. 2F or 2J. The comparator circuit 11 also causes potential at the base of the transistor 3 to be substantially equal to ground potential, resulting in the transistor falling into a turned-off state. The change of the transistor 3 from the turned-on state to the turned-off one quickly varies the primary current I1 flowing through the primary winding 1a of the ignition coil 1, so that magnetic flux in the iron core of the ignition coil may be highly varied to cause a high voltage to be induced across the secondary winding 1b of the ignition coil 1. This results in spark discharge occurring at the ignition plug mounted on the cylinder of the engine to carry out the ignition of the engine.

A phase or angle at which the first integrating voltage Vc1 exceeds the second integrating voltage Vc2 is advanced with an increase in an engine speed.

In the illustrated embodiment, even supposing that the malfunction preventing capacitor 9c is not provided, if any noise which causes the waveform shaping transistor 6d to be turned off is not generated at the signal coil 4 at the time when spark discharge occurs at the ignition plug 2, the first integrating voltage Vc1, as indicated in dotted lines in FIG. 2D, continues to increase at a given rate even after it exceeds the second integrating voltage Vc2 and then returns to zero when the transistor 9a is turned on at the minimum advanced position $\theta2$. In this instance, the spark discharge at the ignition plug 2 continues for a period of time sufficient to allow desired ignition performance to be exhibited. On the contrary, if the capacitor 9c is not provided, noise is generated at the signal coil 4 when the spark discharge is generated at the signal coil 4; and when the transistor 6d is turned off due to the noise, the transistor 9a is turned on to carry out the discharge of the capacitor 8d. Therefore, the first integrating voltage Vc1 is decreased below the second integrating voltage Vc2 at substantially the same time as the generation of the spark discharge, so that the transistor 3 may be turned on again to extinguish the spark discharge of the ignition plug 2. The waveforms of the primary current I1 and secondary current I2 of the ignition coil 1 obtained at this time are as shown in FIGS. 2F and 2G. As will be seen from FIG. 2G, the duration of the spark discharge is highly shortened. Thus, if the malfunction preventing capacitor 9c is not provided, the ignition spark is extinguished for a short period of time when the transistor 6d is turned off by noise generated due to the ignition spark, to thereby deteriorate the ignition performance.

On the contrary, when the malfunction preventing capacitor 9c is provided, the capacitor 9c is charged by electric charge in the signal accumulating capacitor 7e of the allowable interval detecting signal generating circuit 7 for a period of time during which the transistor 6d is turned on or the second signal Vs2 equal to or above the threshold level is not generated. When the first integrating voltage Vc1 exceeds the second integrating voltage Vc2 to generate spark discharge at the ignition plug 2 to cause noise occurring due to the spark discharge to be generated at the signal coil 4, the waveform shaping transistor 6d is turned off due to the noise. Simultaneously with the turning-off of the transistor 6d, a voltage across the capacitor 9c is added to the first integrating capacitor 8d, resulting in the terminal voltage of the capacitor 8d being increased by the amount corresponding to the terminal voltage of the capacitor 9c, resulting in the terminal voltage Vc1 of the capacitor 8d being increased immediately after the generation of the ignition spark, as shown in FIG. 2H. This eliminates a possibility that the turning-on of the transistor 9a due to the noise causes the first integrating capacitor 8d to be discharged to a level equal to or below the terminal voltage of the second integrating capacitor 10d. Accordingly, the reset circuit 9 for resetting the capacitor 8d is effectively prevented from carrying out the malfunction due to noise generated by the ignition spark. The waveforms of the primary current I1 and secondary current I2 of the ignition coil 1 obtained at this time are as shown in FIGS. 2J and 2K. As will be noted from FIG. 2K, the provision of the capacitor 9c allows the duration of the spark to be lengthened sufficiently to accomplish desired ignition performance.

In the embodiment described above, supposing that the speed-up capacitor 8e is not arranged between the collector of the transistor 8c of the first integrating circuit 8 and the base thereof, the initial charge voltage of the capacitor $8d$ is varied depending upon the temperature characteristics of $h_{FE}$ of the transistor $8c$. More particularly, when an ambient temperature is low, the $h_{FE}$ of the transistor $8c$ is small, so that a current supplied to the collector of the transistor $8c$ has a small value determined by the product $Ib \times h_{FE}$ between the base current $Ib$ of the transistor determined by the resistance of the resistor $8a$ and $h_{FE}$. Accordingly, in this instance, not only the initial charging voltage $Vo'$ of the capacitor $8d$ is restricted to a low value but the rising time of the voltage is delayed, as indicated at dotted lines in FIG. 3C. Whereas, when an ambient temperature is high, the collector current of the transistor $8c$ is increased because of the $h_{FE}$ being large; so that the initial charge voltage $Vo''$ of the capacitor $8d$ is increased as indicated in a solid line in FIG. 3C. Thus, the absence of the capacitor $8e$ causes the first integrating voltage $Vc1$ to be varied due to an ambient temperature to lead to the variation of ignition timing of the engine due to an ambient temperature, to thereby adversely affect the performance of the engine.

Figure 3:
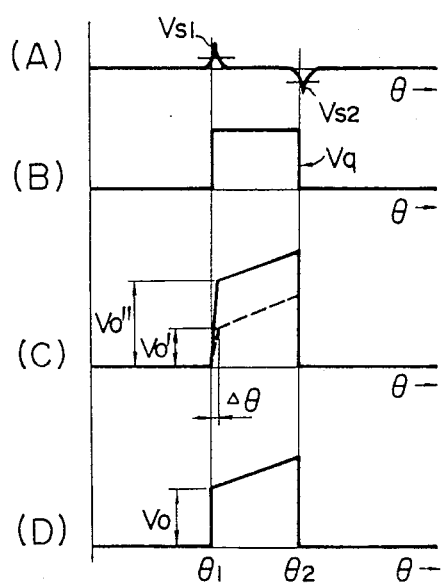
FIG. 3 is a waveform showing the operation of a speed-up capacitor.

On the contrary, the provision of the speed-up capacitor $8e$ as in the illustrated embodiment allows a charging current to flow through the capacitor $8e$ simultaneously with the rising of the allowable interval detecting signal $Vq$, resulting in a large current being supplied to the base of the transistor $8c$. Thus, the provision of the the capacitor $8e$ significantly quickens the rising time of collector current of the transistor $8c$, and accomplishes out an increase in initial value of the charging voltage $Vo$ and the quickening of rising time of the voltage. Accordingly, it will be noted that when the capacitor $8e$ is provided, the first integrating voltage $Vc1$ is not substantially affected by an ambient temperature and has a waveform as shown in FIG. 3D irrespective of variation of an ambient temperature.

Figure 4:
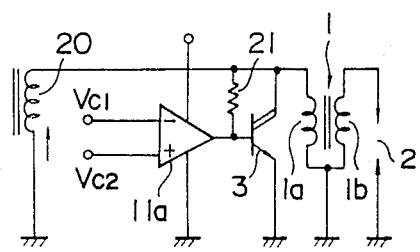
FIG. 4 is a circuit diagram showing another embodiment of an ignition system for an internal combustion engine according to the present invention.

In the embodiment described above, the transistor 3 acting as the primary current control switch is connected in series with respect to the primary winding $1a$ of the ignition coil 1. However, the present invention may contain an ignition system of the current interrupting type that a primary current control switch is connected in parallel to the primary winding of an ignition coil. For example, the present invention contains an ignition system constructed in a manner such that a collector-emitter circuit of a transistor 3 is connected in parallel to a primary winding $1a$ of an ignition coil 1 and an exciter coil 20 is connected in parallel to the collector-emitter circuit of the transistor 3, as shown in FIG. 4. In the ignition system shown in FIG. 4, the exciter coil 20 is arranged in a magneto driven by an engine and is adapted to generate an AC voltage in synchronism with the rotation of the engine. An output terminal of a comparator $11a$ is connected to the base of the transistor 3 and a resistor 21 is connected between a base of the transistor 3 and a collector thereof. When a first integrating voltage $Vc1$ is equal to or below a second integrating voltage $Vc2$, potential at the output terminal of the comparator $11a$ is at a high level to allow the transistor 3 to be turned on. When a voltage is induced across the exciter coil 20 in the direction indicated by an arrow in FIG. 4 in the case that the potential at the output terminal of the comparator $11a$ is at a high level, a current is allowed to flow through the base of the transistor 3 to turn on the transistor 3. This results in a short-circuit current flowing from the exciter coil 20 through the collector-emitter circuit of the transistor 3.

Whereas, when the first integrating voltage $Vc1$ exceeds the second integrating voltage $vc2$ to cause the potential at the output terminal of the comparator $11a$ to be equal to ground potential, the transistor 3 falls into a turned-off state to cause a high voltage to be induced across the exciter coil 20, which is then applied to the primary winding $1a$ of the ignition coil 1. This leads to a significant variation of magnetic flux in an iron core of the ignition coil 1, to thereby cause a high voltage to be induced across the secondary winding $1b$.

As can be seen from the foregoing, the present invention eliminates the use of a flip flop circuit constituted by a plurality of logic elements to allow the structure of the ignition system to be highly simplified. Also, the present invention effectively prevents the malfunction of the allowable interval detecting signal generating circuit due to noise by suitably setting the trigger level of each of the charge control transistor switch and discharge control transistor switch.

Further, the ignition system of the present invention is constructed in the manner that the speed-up capacitor is connected between the base of the transistor of the first integrating circuit and the emitter thereof, thus, the present invention allows the first capacitor to be charged to the initial voltage of a substantially constant level irrespective of an ambient temperature to eliminate the influence of an ambient temperature thereon.

Furthermore, in the present invention, the reset circuit is provided with the malfunction preventing capacitor. Such construction of the present invention has a significant advantage of preventing the first integrating capacitor from being discharged to a level below the second integrating voltage when the reset transistor is turned on due to noise generated at the ignition operation, to thereby prevent the first integrating voltage from being decreased to or below the second integrating voltage to shorten the duration of spark discharge.

It will thus be seen that the objects set forth above, among those made apparent from the preceding description, are efficiently attained and, since certain changes may be made in the above construction without departing from the spirit and scope of the invention, it is intended that all matter contained in the above description as shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An ignition system for an internal combustion engine comprising:
   an ignition coil;
   a primary current control switch arranged on the primary winding side of said ignition coil; and
   a control circuit for carrying out control which causes said primary current control switch to be changed from a turned-on state to a turned-off state at the ignition timing of the engine in order to quickly vary a primary current of said ignition coil to generate a high voltage for ignition; wherein
   said control circuit comprises:
   signal generating means which generates first and second signals at the maximum advanced position $\theta1$ and minimum advanced position $\theta2$ of the ignition timing of said engine in synchronism with the rotation of said engine, respectively;

a first pulse shaping circuit for shaping said first signal into a pulse-like form to generate a first pulse signal Vp1 at said maximum advanced position $\theta$1;

a second pulse shaping circuit for shaping said second signal into a pulse-like form to generate a second pulse signal Vp2 at said minimum advanced position $\theta$2;

an ignition operation allowable interval detecting signal generating circuit for generating an ignition operation allowable interval detecting signal which continues from said maximum advanced position $\theta$1 to the minimum advanced position $\theta$2 by using said first and second pulse signals as its input signals;

said ignition operation allowable interval detecting signal generating circuit comprising a charge control transistor switch which is turned on when said first pulse signal is generated, a signal accumulating capacitor which is momentarily charged to a fixed level through said charge control transistor switch, and a discharge control transistor switch which momentarily discharges said signal accumulating capacitor when said second pulse signal is generated;

a first integrating circuit controlled by said ignition operation allowable interval detecting signal to carry out the integrating operation for charging a first integrating capacitor from said maximum advanced position $\theta$1 to said minimum advanced position $\theta$2;

a reset circuit which momentarily discharges said first integrating capacitor when said second pulse signal is generated;

a second integrating circuit controlled by said second pulse signal to carry out the integrating operation for charging a second integrating capacitor at a fixed time constant from a position right after a minimum advanced position to the next minimum advanced position and momentarily discharging said second integrating capacitor at said next minimum advanced position; and a comparator circuit having an output terminal coupled to a control signal input terminal of said primary current control switch and using a first integrating voltage Vc1 generated across said first integrating capacitor and a second integrating voltage Vc2 generated across said second integrating capacitor as its input signals to keep said primary current control switch at a turned-on state when said first integrating voltage is equal to or below said second integrating voltage and turn off said primary current control switch when said first integrating voltage exceeds said second integrating voltage.

2. An ignition system for an internal combustion engine as defined in claim 1, wherein said signal generating means comprises a signal coil which generates first and second signals Vs1 and Vs2 equal to or above a threshold level Vt at the maximum advanced position $\theta$1 and minimum advanced position $\theta$2 of ignition timing of the engine, respectively.

3. An ignition system for an internal combustion engine as defined in claim 1, wherein said second pulse shaping circuit includes a waveform shaping transistor which is kept at a turned-off state for a period of time during which said second signal is equal to or above a threshold level Vt and at a turned-on state for the remaining period of time and generates the second pulse signal vp2 between a collector thereof and an emitter thereof.

4. An ignition system for an internal combustion engine as defined in claim 1, wherein said first integrating circuit carries out the integrating operation for momentarily charging said first integrating capacitor to a fixed voltage at said maximum advanced position and further charging said first integrating capacitor until said minimum advanced position.

5. An ignition system for an internal combustion engine as defined in claim 4, wherein said first integrating circuit comprises a voltage divider for dividing a voltage across said signal accumulating capacitor; a first integrating circuit transistor having a base connected to a voltage dividing point of said voltage divider, a collector connected to a positive terminal of said signal accumulating capacitor and an emitter connected to a positive terminal of said first integrating capacitor; a charge resistor connected between a collector of said first integrating circuit transistor and an emitter thereof; and a speed-up capacitor connected between a base of said first integrating circuit transistor and the emitter thereof.

6. An ignition system for an internal combustion engine as defined in claim 1, wherein said second integrating circuit comprises a second integrating capacitor charge circuit for supplying a charge current to said second integrating capacitor and a discharge transistor of which a collector-emitter circuit is connected in parallel with respect to said second integrating capacitor.

7. An ignition system for internal combustion engine as defined in claim 3, wherein said reset circuit comprises a reset transistor of which a collector-emitter circuit is connected in parallel with said first integrating capacitor and the base is connected to said collector of said waveform shaping transistor of said second pulse shaping circuit, and a malfunction preventing capacitor having one end connected to a collector of said reset transistor and the other end connected to the collector of said waveform shaping transistor.

* * * * *